May 24, 1949.  E. F. ANDREWS  2,471,184
TRUCK HITCH
Filed July 31, 1947
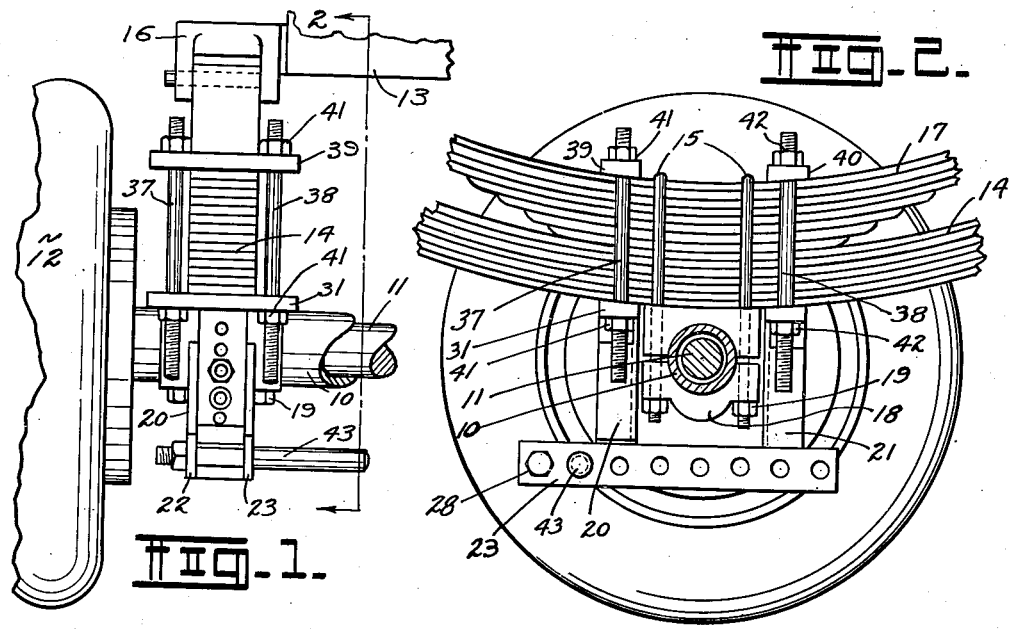
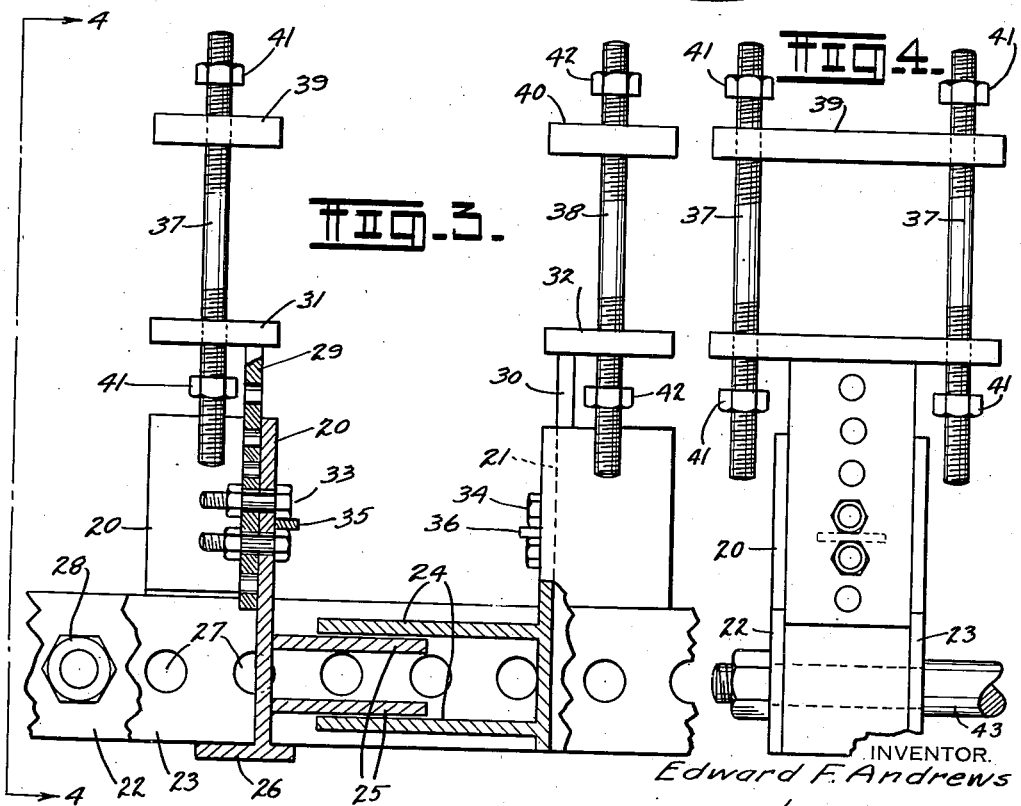
INVENTOR.
Edward F. Andrews
BY W. B. Harpman
ATTORNEY.

Patented May 24, 1949

2,471,184

UNITED STATES PATENT OFFICE 2,471,184

TRUCK HITCH

Edward F. Andrews, Youngstown, Ohio, assignor to The Miller Spreader Corporation, Youngstown, Ohio, a corporation of Ohio Application July 31, 1947, Serial No. 765,214

1 Claim. (Cl. 280—33.44)

This invention relates to a hitch and more particularly to a hitch which may be conveniently attached to axle and spring constructions of trucks so that spreader boxes and the like may be attached thereto.

The principal object of the invention is the provision of a hitch for a truck which may be bolted to conventional truck axle and spring constructions of varying sizes and shapes to provide convenient means for the attachment of spreader boxes and other similar devices.

A further object of the invention is the provision of a hitch applicable to truck and spring axle constructions and capable of manual adjustment as to size and shape prior to and during its application to a truck spring and axle construction.

A still further object of the invention is the provision of a manually adjustable hitch which may be preset as to height and width to facilitate the installation of the same on various truck spring and axle constructions.

A still further object of the invention is the provision of a hitch for truck rear axle constructions providing several alternate locations for a hitching member to which various devices such as spreader boxes and the like may be attached.

The hitch shown and described herein comprises an improvement over that shown in my copending patent application on Adjustable truck hitch, Serial No. 753,614, as filed June 10, 1947, now Patent No. 2,456,359, dated Dec. 14, 1948, particularly in that the hitch herein disclosed may be manually preset as to effective height and width for application to any and all truck axle and spring constructions and without the use of various blocking or spacing devices such as are required in the heretofore referred to copending patent application.

It is well known in the art that various spreader boxes and the like are used in connection with trucks and the like for road building activities and that it is therefore highly desirable to provide simple and efficient means by which the spreader boxes may be conveniently attached to the trucks so that they may be operated in conjunction therewith as in a paving operation.

Various forms of hitches have been proposed, the majority of which are applicable only to certain kinds and types of truck rear axle and spring constructions, and a further object of the present invention is, therefore, to provide a universally adaptable truck hitch.

The present disclosure relates to a truck hitch which can be adjusted both with respect to width and height, locked in adjusted position and then bolted to the rear axle and spring assembly of a truck to provide a transversely positioned hitching member disposed beneath the truck axle to which a spreader box or similar device may be conveniently attached.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:

Figure 1 is a rear view of a portion of a truck rear axle frame and spring construction and illustrates the positioning of the truck hitch thereon. Line 2—2 on Figure 1 indicates the view in Figure 2.

Figure 2 is a cross section of a portion of a truck rear axle and spring construction showing the positioning of the truck hitch thereon.

Figure 3 is a side view of the truck hitch with parts broken away and parts in cross section and on an enlarged scale with respect to Figures 1 and 2. Line 4—4 on Figure 3 indicates the view of Figure 4.

Figure 4 is an end view taken on line 4—4 of Figure 3.

By referring to the drawings and Figures 1 and 2 in particular it will be seen that a portion of a rear axle housing 10 of a truck has been disclosed enclosing a section of the rear axle 11. A wheel 12 is affixed to the axle 11 and normally supports the same in elevated relation to a supporting surface. The truck frame is indicated by the numeral 13 and a spring 14 is positioned on the axle housing 10 and affixed thereto by means of inverted U-shaped bolts 15 and to the frame 13 of the truck by means of shackles 16.

As disclosed in Figures 1 and 2 of the drawings the main truck spring 14 is augmented with a secondary helper or overload spring 17 which for all intents and purposes becomes a portion of the main spring 14 as it merely increases the effective height thereof over which the inverted U-shaped bolts 15 extend. As is customary in truck rear axle and spring constructions, the lowermost ends of the inverted U-shaped bolts 15 pass through openings in and are affixed to saddle caps 18 by means of a plurality of nuts 19 engaging the inverted U-shaped bolts 15.

In order that the device may be positioned beneath the axle housing 11 so that a spreader box or similar piece of equipment may be attached thereto, a truck hitch is affixed to each of the spring and axle assemblies 10 and 14, respectively, one on each side of the differential case of the rear axle housing 10, so that oppositely disposed hitches may be provided. Each of the truck hitches comprises an identically formed structure capable of being preset as to width and height and then bolted directly to the spring and axle assemblies.

As illustrated in the drawings, the truck hitch will be seen to comprise a pair of spaced, vertically positioned channels 20 and 21, respectively, affixed at their lowermost ends by a pair of horizontal rails 22 and 23 spaced with respect to one another by means of a pair of webs 24 and 25. The webs 24 are spaced vertically with respect to one another and affixed to the vertical channel 21 and the spaced, horizontal rails 22 and 23. The webs 25 are spaced vertically with respect to one another and are capable of telescopically engaging the spaced webs 24 and affixed to the channel 20. The vertical channel 21 is welded to the spaced rails 22 and 23 and is, therefore, always in fixed position with respect thereto. The vertical channel 20 and its interconnected, web-like extensions 25 are slidably disposed between the rails 22 and 23 and retained therein by reason of a cross piece 26 affixed to the lowermost end thereof and slidably engaging the bottoms of the spaced rails 22 and 23.

A plurality of openings 27 are formed in the spaced rails 22 and 23 so that bolt means 28 may be positioned therethrough to clamp the rails 22 and 23 against the sides of the vertical channel 20 and hence lock it in discharge position with respect thereto. It will thus be seen that the relative positioning and horizontal spacing of the vertical channels 20 and 21 may be readily varied to suit the particular width of the axle and spring mounting assemblies encountered.

In order that the device may be adjusted for various vertical heights of axle and spring combinations, each of the vertical channels 20 and 21 is provided with a T-headed extension piece 29 and 30, respectively, the T heads thereof being indicated by the numerals 31 and 32, respectively. Each of the T-headed extensions 29 and 30 lies within the respective channels 20 and 21 and is vertically movable therein and is normally held in desired relation with respect thereto by means of pairs of bolts 33 and 34, respectively. Bars 35 and 36 welded to the outer surfaces of the channels 20 and 21, respectively, provide means for holding the bolts 33 and 34 from rotation when the nuts thereon are tightened.

The particular arrangement of the vertically adjustable T-headed member 29 is best shown in Figures 3 and 4 of the drawings and by referring thereto it will be seen that the T heads 31 and 32 are illustrated in elevated relation with respect to the uppermost ends of the vertical channels 20 and 21 thereby corresponding with the showing in Figures 1 and 2 in which the main spring 14 and helper spring 17 are illustrated and the effective height of the springs thereby increased.

By again referring to Figures 1 and 2 of the drawings it will be seen that pairs of studs 37 and 38, threaded at their upper and lowermost ends, are positioned vertically through openings formed in the T heads 31 and 32 of the T-headed extensions 29 and 30 so that the pairs of studs 37 and 38 extend upwardly along side the springs 14 and 17. The uppermost ends of the pairs of studs 37 and 38 are passed through brackets 39 and 40, respectively, which extend across the upper surface of the helper spring 17. A plurality of nuts 41 and 42 are positioned on the upper and lower ends of the pairs of studs 37 and 38, respectively, and above the brackets 39 and 40, respectively, and below the T heads 31 and 32, respectively.

When the plurality of nuts 41 and 42 are tightened, the device is effectively clamped to the springs 14 and 17 and spaced about the axle housing 10 and saddle caps 18 as well as the inverted U-shaped bolts 15 heretofore mentioned. It will thus be seen that when various spring arrangements are encountered in truck rear axle constructions, the truck hitch may be adjusted vertically by moving the T-headed members 29 and 30 with respect to the channels 20 and 21 in which they are positioned by simply replacing the bolts 33 and 34 so that they register in any one of a number of alternate openings formed in the T-headed members 29 and 30.

The formation of the device is convenient, and easy horizontal adjustment as well as convenient vertical adjustment readily adapts it to universal application on truck rear axle and spring combinations of various sizes and shapes. It also provides for the desirable positioning of the spaced rails 22 and 23 with respect to the rear axle housing 10 so that hitch pins 43 may be positioned parallel with the axle housing 10 and beneath the same and in oppositely disposed relation. The spaced rails 22 and 23 are provided with a plurality of openings 27 as heretofore mentioned and the hitch pins 43 may be positioned in any of the several openings thereby providing flexibility of contact points for spreader boxes and the like to be attached to the truck hitch.

It will thus be seen that a simple and efficient truck hitch has been disclosed which may be mass produced on a common pattern and individually adjusted to individual truck rear spring and axle constructions for application thereto at the time of such application. It will further be seen that once in position on the truck, as heretofore described, pairs of truck hitches provide desirably located hitch means to which spreader boxes and the like can be readily attached and detached.

Having thus described my invention, what I claim is:

A hitch for attachment to the rear axle and spring assembly of a truck and including a horizontal body member displaced longitudinally of said truck, a pair of longitudinally displaced vertical channel members positioned on said horizontally body member, one of which is movable longitudinally with respect thereto, a T-headed member adjustably positioned in each of the said vertical channel members and having openings formed in the T heads thereof, brackets having openings therein and pairs of studs engaging the openings in the said brackets and the T-headed members, respectively, for mounting the said hitch on the said spring assembly of the truck, and a hitch pin affixed to the said horizontal body member and extending sidewardly therefrom.

EDWARD F. ANDREWS.

REFERENCES CITED

The following references are of record in the file of this patent:

UNITED STATES PATENTS

| Number | Name | Date |
| --- | --- | --- |
| 1,865,365 | Foote | June 28, 1932 |
| 1,955,649 | Nuccio | Apr. 17, 1934 |
| 2,397,001 | Goodwin | Mar. 19, 1946 |
| 2,403,820 | Miller | July 9, 1946 |